US009923812B2

(12) United States Patent
Farinacci et al.

(10) Patent No.: US 9,923,812 B2
(45) Date of Patent: *Mar. 20, 2018

(54) TRIPLE-TIER ANYCAST ADDRESSING

(71) Applicant: Cisco Technology, Inc., San Jose, CA (US)

(72) Inventors: Dino Farinacci, San Jose, CA (US); Thomas Edsall, Cupertino, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 44 days.

This patent is subject to a terminal disclaimer.

(21) Appl. No.: 14/256,919

(22) Filed: Apr. 18, 2014

(65) Prior Publication Data

US 2014/0226669 A1 Aug. 14, 2014
US 2017/0346733 A9 Nov. 30, 2017

Related U.S. Application Data

(63) Continuation of application No. 13/584,546, filed on Aug. 13, 2012, now Pat. No. 8,743,738, which is a (Continued)

(51) Int. Cl.
| | |
|---|---|
| *H04L 12/46* | (2006.01) |
| *H04L 12/701* | (2013.01) |
| *H04L 12/741* | (2013.01) |
| *H04L 12/775* | (2013.01) |
| *H04L 12/931* | (2013.01) |
| *H04L 12/939* | (2013.01) |
| *H04L 29/12* | (2006.01) |

(52) U.S. Cl.
CPC .......... *H04L 45/74* (2013.01); *H04L 12/4633* (2013.01); *H04L 45/00* (2013.01); *H04L 45/58* (2013.01); *H04L 49/351* (2013.01); *H04L 49/552* (2013.01); *H04L 49/604* (2013.01); *H04L 49/70* (2013.01); *H04L 61/103* (2013.01); *H04L 61/6022* (2013.01); *H04L 61/6077* (2013.01)

(58) Field of Classification Search
CPC ......... H04L 29/12018; H04L 29/12028; H04L 61/10–61/106; H04L 61/6022; H04L 61/6077
See application file for complete search history.

(56) References Cited

U.S. PATENT DOCUMENTS

| 8,259,720 B2 * | 9/2012 | Farinacci ............ H04L 12/4633 370/392 |
| --- | --- | --- |
| 2003/0108052 A1 * | 6/2003 | Inoue ................ H04L 29/12377 370/399 |

(Continued)

*Primary Examiner* — Timothy J Weidner
(74) *Attorney, Agent, or Firm* — Ronald Fernando

(57) ABSTRACT

In one embodiment, a solution is provided wherein redundant routers are treated as a single emulated switch. When a packet is received at a layer 2 edge switch from a host, the layer 2 edge switch may determine a switch identifier for the emulated switch using a destination anycast hardware address contained in the packet. The anycast hardware address may identify an emulated switch comprising a plurality of routers. Then a header may be added to the packet, the header including the switch identifier. Following that, the packet may be forwarded to another layer 2 switch along a shortest path from the layer 2 edge switch to the emulated switch.

16 Claims, 15 Drawing Sheets

Related U.S. Application Data continuation of application No. 11/670,544, filed on Feb. 2, 2007, now Pat. No. 8,259,720.

(56) References Cited

U.S. PATENT DOCUMENTS

2008/0186968 A1* 8/2008 Farinacci ............ H04L 12/4633
370/392
2008/0235400 A1* 9/2008 Slocombe ............... H04L 29/06
709/245

* cited by examiner

US 9,923,812 B2

TRIPLE-TIER ANYCAST ADDRESSING

RELATED APPLICATIONS

This application is a continuation application of U.S. patent application Ser. No. 13/584,546 filed Aug. 13, 2012, and this application also claims priority from U.S. patent application Ser. No. 11/670,544 filed on Feb. 2, 2007, and both of the aforementioned applications are hereby incorporated by reference for all purposes.

BACKGROUND OF THE INVENTION

1. Technical Field

The present invention relates to computer networking.

2. Description of the Related Art

Data management within organizations is an ever increasing concern, especially with the rise of the Internet information age. The heart of this data management function is sometimes known as a data center. Over the last decade, data centers have evolved into the strategic focus of Information Technology (IT) efforts to protect, optimize, and grow the organization.

DESCRIPTION OF EXAMPLE EMBODIMENTS

Overview

In one embodiment, a solution is provided wherein redundant routers are treated as a single emulated switch. When a packet is received at a layer 2 edge switch from a host, the layer 2 edge switch may determine a switch identifier for the emulated switch using a destination anycast hardware address contained in the packet. The anycast hardware address may identify an emulated switch comprising a plurality of routers. Then a header may be added to the packet, the header including the switch identifier. Following that, the packet may be forwarded to another layer 2 switch along a shortest path from the layer 2 edge switch to the emulated switch.

Example Embodiments

In this application, numerous specific details are set forth in order to provide a thorough understanding of the present invention. It will be obvious, however, to one skilled in the art, that the present invention may be practiced without some or all of these specific details. In other instances, well known process steps have not been described in detail in order to not obscure the present invention.

Figure 1:
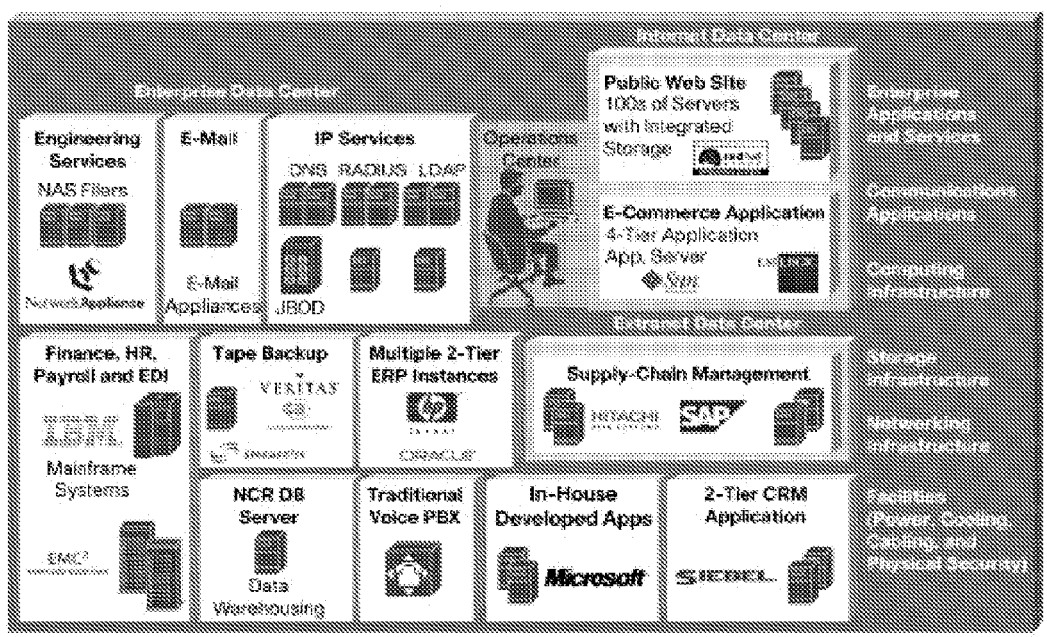
FIG. 1 illustrates an "isolated application" environment.

Data center managers face several challenges in fulfilling the goals of data centers. Most enterprise data centers grew rapidly to meet the explosive economic growth of recent times. Consequently, applications commonly stand alone in underutilized, isolated infrastructure silos. Each infrastructure silo is designed based on the inclination of the specific application being deployed, so that a typical data center supports a broad assortment of operating systems, computing platforms, and storage systems. The disparate infrastructures supporting different application "islands" are difficult to change or expand and expensive to manage, integrate, secure, and back up. FIG. 1 illustrates an "isolated application" environment.

Figure 2:
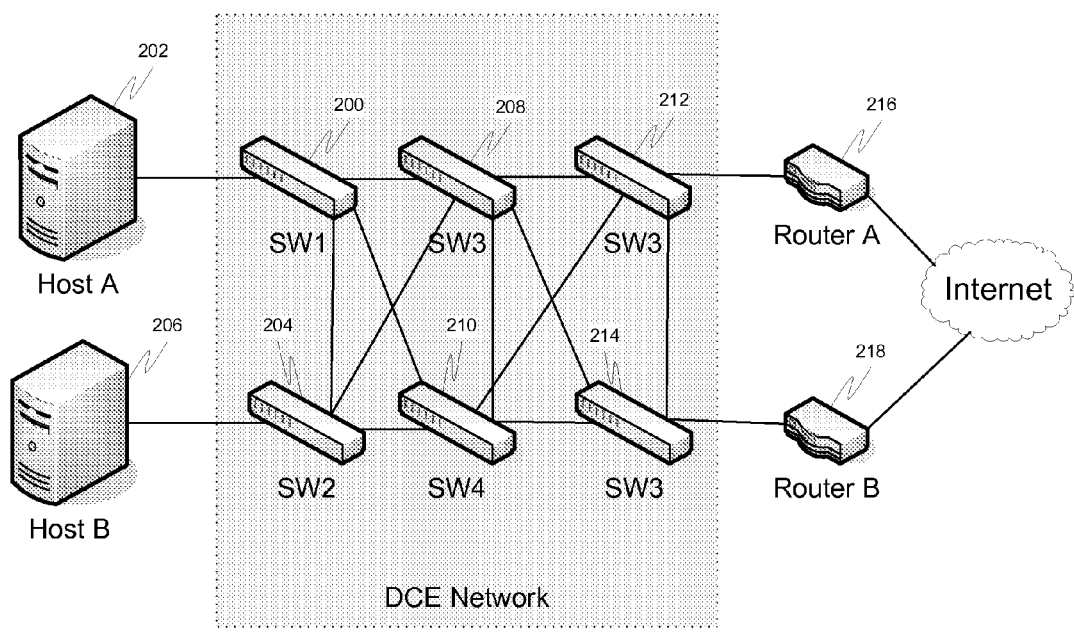
FIG. 2 illustrates a DCE network.

One solution to this problem is to design a data center environment that is highly scalable, resilient, secure, and able to integrate multiple applications and protocols. One such solution is known as the Data Center Network Architecture. A specific implementation of the Data Center Network Architecture is known as Data Center Ethernet (DCE). DCE allows for consolidation of input and output, and improved forwarding of communications within the network. This may be accomplished via specialized protocols and functionality operated by switches within a DCE network via network layer 2. Each of the switches within the DCE network may be a layer 2 device. FIG. 2 illustrates a DCE network. Edge switch 200 may be connected to a host 202. Edge switch 204 may be connected to host 206. Edge switches 200, 204 may then be connected to several core switches 208, 210, which then may be connected to other edge switches 212, 214. Each DCE switch may be assigned a unique identifier. A routing protocol, such as Intermediate-System-to-Intermediate-System (IS-IS), may be used inside DCE. Edge switches implementing this routing protocol may append information to packets sent though the DCE. This appended information may be in the form of a MAC-in-MAC header attached to the packet. Edge switches 212, 214 may then each be connected to layer 3 devices, such as routers 216, 218. Rather than forwarding packets to MAC addresses, DCE switches send packets to edge switches based on the edge switch identification via the MAC-in-MAC header. The edge switch then knows which of its ports to send the packet out to arrive at the correct IP address (for example, the port connected to router 216), and strips off the MAC-in-MAC header prior to doing so.

Rather than operate routers 216 and 218 independently, it is often beneficial to link the routers so that one router can act as a backup to the other router in case of router or link failure. This linking may be accomplished via another routing protocol, such as Hot Standby Routing Protocol (HSRP). Other hot standby routing protocols include Virtual Router Redundancy Protocol (VRRP) and Gateway Load Balancing Protocol (GLBP). In these protocols, several routers are connected to the same subnet of a network and work together to present the appearance of a single virtual router. Typically, a single virtual IP address is assigned to the routers, which the links to a single virtual MAC address. The single virtual MAC address, however, points to a particular one of the routers, designated as the "active" router, whereas the other router(s) are designated as "backup." If one router goes down, another takes over and the virtual MAC address is mapped to the backup router. However, while both are running, only one is being used for outbound communications. This can be inefficient for several reasons.

First of all, using just one of a plurality of redundant routers as the active router for outbound communications can create a bottleneck at the single router or on one of its associated links. It would be much more efficient to load balance between the redundant routers. Second of all, even if a hot routing protocol is utilized to load balance between redundant routers, the traffic generated by these protocols can be wasteful. Third of all, the amount of time for a router to switch from active to backup is non-trivial. If faster convergence is desired, a different solution is required.

A solution is provided wherein the redundant routers are treated as a single emulated switch. This allows for both a failure recovery and a load-balancing mechanism for host-switch-router connectivity through a protocol, such as DCE, used in network containing layer 2 switches. Through the use of this solution, hot standby routing protocols such as HSRP, VRRP, and GLBP can be eliminated.

Configuration of the network may be accomplished by first assigning the same IP address to all routers in the emulated switch. This IP address may be known as the "router anycast address." Additionally, the same MAC address may be assigned to all routers in the emulated switch. This MAC address may be known as a "router anycast MAC address." Each host may then be configured with a default router using a virtual IP address. The virtual IP address maps to a virtual MAC address. The virtual MAC addresses for the routers in the virtual switch correspond to a single anycast hardware address. The anycast hardware address may be used as a switch identification. This switch identification may be advertised to all layer 2 switches within the network using a protocol such as IS-IS, RIP, or (EIGRP) as long as the edge switches have a reachable connection to the router.

Figure 3:
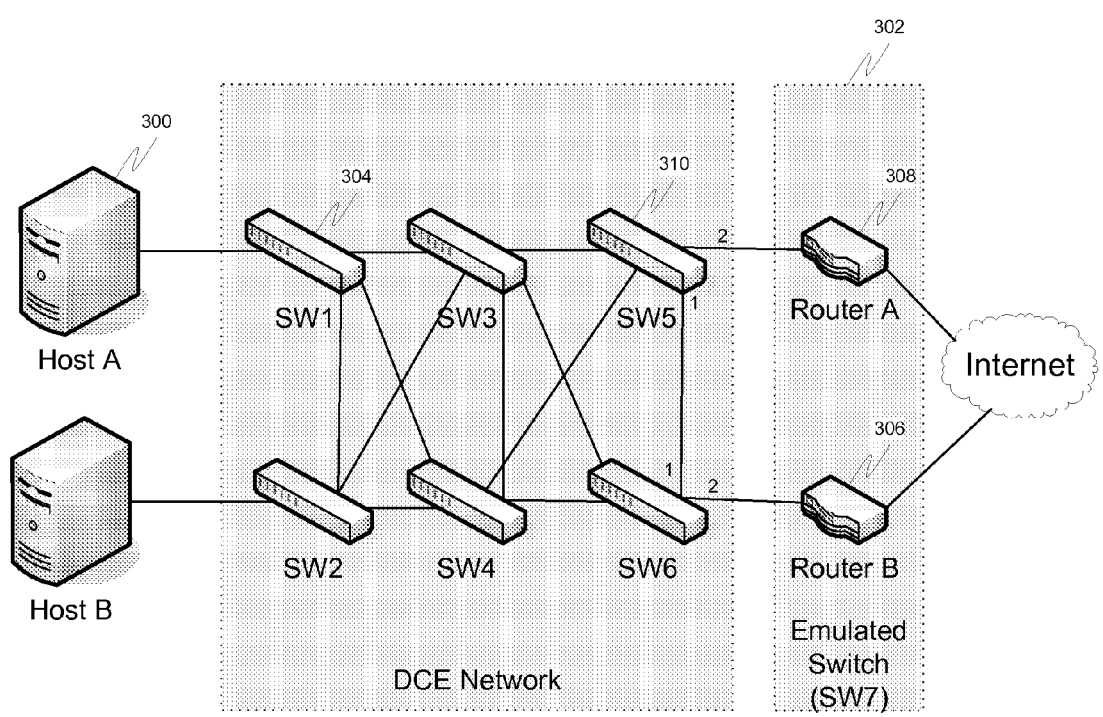
FIG. 3 illustrates an example network containing layer 2 switches coupled to an emulated switch.

FIG. 3 illustrates an example network containing layer 2 switches coupled to an emulated switch. When a packet is to be sent from a host 300 to a network, such as the Internet, coupled to the emulated switch 302, it may forward the packet to the closest edge switch 304. However, this host 300 does not have a MAC address of a default router in its memory, such as an address resolution protocol (ARP) cache. Therefore, the host 300 may first send a request for the router anycast address as, for example, an ARP request. The ARP request is a broadcast packet that is transmitted across the DCE network on the broadcast tree. Since the set of routers is part of an emulated anycast switch, only one link into the emulated anycast switch receives the ARP request. This may be accomplished by, for example, coordination between edge switches connected to a particular emulated switch. The link on which the request is sent is connected to a single router, despite the fact that the router may be a part of an emulated switch.

The router that receives the ARP request may ARP reply by sending a unicast packet to the ARP requesting host. This allows the first-hop switch, directly connected to the host, to know the edge switch associated with the router. This edge switch may be identified according to the switch identification associated with the emulated anycast switch. The ARP reply may be sent with the source MAC address equal to the router anycast MAC address so that the edge switches, directly connected to the hosts, associate the MAC address with the emulated anycast switch.

At this point the host's off subnet traffic will find the shortest path to the emulated anycast switch. This may or may not be the same router that replied to the ARP request. For example, while router 306 may have responded to the ARP request, the path to router 308 may actually be the shortest path for traffic. Other hosts will find their own shortest paths to the emulated anycast switch, which may be through a different router. This effectively load balances between the redundant routers in the emulated switch. Additionally, if the connection to a particular router goes down, either by a topology change in the network or the router itself goes down, traffic is quickly rerouted to other routers. This is because a protocol, such as DCE, used in a network containing layer 2 switches, can discover topology changes or downed links much faster than a hot standby routing protocol such as HSRP, VRRP or GLBP. A solution is provided that takes advantage of this fact to perform failover much quicker than prior art solutions since failover can now be performed by the network of switches itself.

Figure 4:
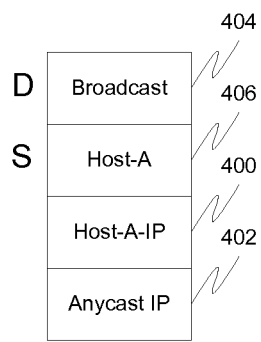
FIG. 4 illustrates an example of an ARP request packet.

Assume host A 300 wants to discover a MAC address for one of the routers 306, 308. It may transmit the ARP packet depicted in FIG. 4. The IP source address 400 may be the IP address of A. The IP destination address 402 may be the anycast IP address of SW7. The Layer 2 destination address 404 of the packet may be set to broadcast (all addresses). The layer 2 source address 406 may be Host-A 406.

Figure 5:
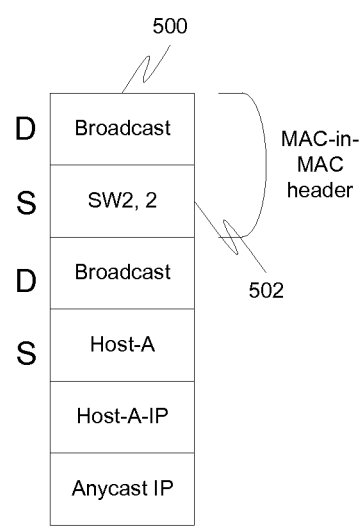
FIG. 5 illustrates an example of an ARP request packet with an appended MAC-in-MAC header.
Figure 6:
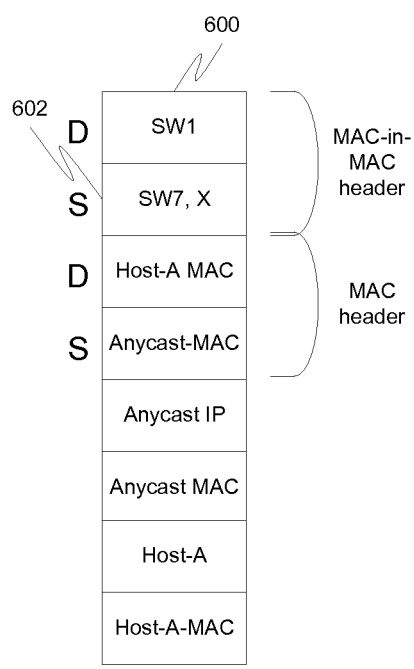
FIG. 6 illustrates an example of an ARP reply packet with an appended MAC-in-MAC header.

Upon receipt of the ARP packet from Host A 302, switch SW1 304 learns Host A 300 is off a particular interface (for example, interface 2). It may then append the MAC-in-MAC header depicted in FIG. 5. Here, the destination 500 may be set to broadcast, since the packet is still an ARP request, while the source may be set to SW2, 2, indicating switch 2, interface 2. A loop-free broadcast tree may be built which includes emulated SW5, and thus the tree indicates the shortest path to emulated SW7 302 (this may have been performed earlier in the process than the receipt of the ARP request). The ARP request may then be passed via the shortest path to emulated switch SW7. However, edge switch SW5 310, recognizing that the next switch is an emulated switch, may strip the MAC-in-MAC header. One of the routers 306, 308 may receive the ARP request and respond with an ARP reply. Here, it is assumed that this would be router 308. Upon receiving the ARP reply, edge switch SW5 310 may add a MAC-in-MAC header to arrive at the packet depicted in FIG. 6. The destination address 600 of the MAC-in-MAC header in the reply may be SW1. The source address 602 of the MAC-in-MAC header of the reply may be emulated switch SW7. An interface identification may also be included but such a value is irrelevant anyway since the packet is not going to be used to perform forwarding. Edge switch SW5 310 may then learn that router 308 is on its interface (e.g., interface 2). This information may be synchronized with information on switches throughout the DCE network, so that each switch knows that router 308 is on the interface of edge switch SW5 310. The ARP reply may then flow through switches 312, 304 to host A 300.

When host 300 then wishes to send normal traffic out through the anycast hardware address corresponding to emulated switch SW7 302, SW2 304 may receive the traffic. It may then look up the anycast hardware address in its table, finding that it is on emulated switch SW7. It then may add the MAC-in-MAC header to the traffic and forward it via the shortest path to emulated switch SW7. Once again, edge switch 310 recognizes that switch SW7 is an emulated switch and strips the MAC-in-MAC header off prior to forwarding it on. By doing so, routers 306 and 308 have been load balanced because a packet originating from host A 300 will be transmitted through router 308 (using the shortest path) while a packet originating from sever B 314 will be transmitted through router 306. In cases where both paths are equal, a tie-breaking mechanism may be used such as hashing based on the source address. Additionally, as stated above, if one link goes down, the DCE network is able to forward all packets to the other router until such time as the link is restored.

Figure 7:
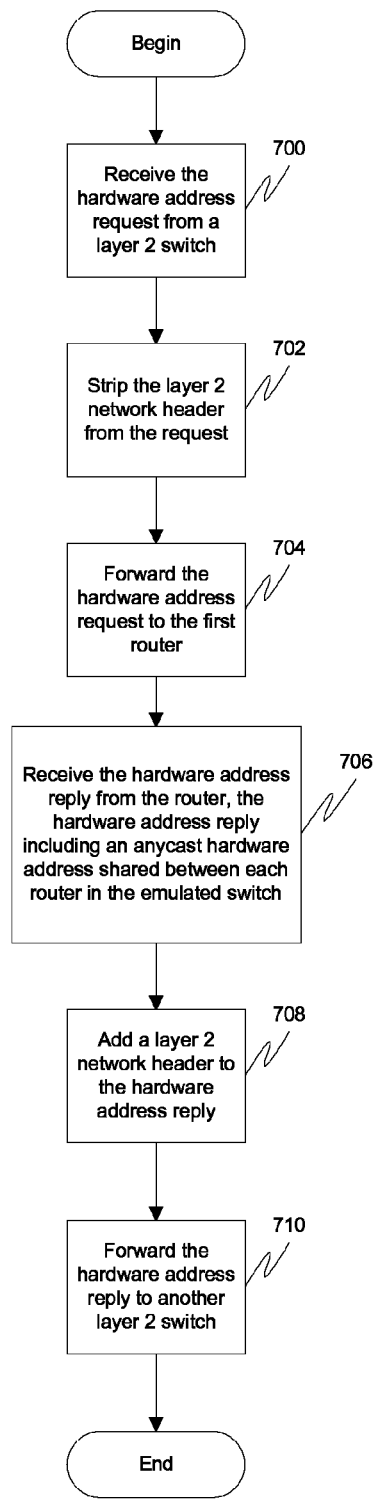
FIG. 7 illustrates an example method for handling a hardware address request to a router in an emulated switch of two or more routers.

FIG. 7 illustrates an example method for handling a hardware address request, such as an ARP request or an IPv6 Neighbor Solicitation, to a first router in an emulated switch of two or more routers. This process may be performed at a layer 2 edge switch in a network containing layer 2 switches. At 700, the hardware address request may be received from a layer 2 switch. This request may be an ARP request and may include a layer 2 network header (e.g., MAC-in-MAC header) that was added to the request by another layer 2 switch (not necessarily the layer 2 switch from which the request was directly received). At 702, this layer 2 network header may be stripped from the request. At 704, the hardware address request may be forwarded to the first router. It does not matter which router within the emulated switch is designated as the first router. At 706, a hardware address reply may be received from the router. This reply may be an ARP reply and may include an anycast hardware address shared between each router in the emulated switch. At 708, a layer 2 network header, such as a MAC-in-MAC header, may be added to the hardware address reply. At 710, the hardware address reply may be forwarded to another layer 2 switch. This may or may not be the same layer 2 switch as in 700.

Figure 8:
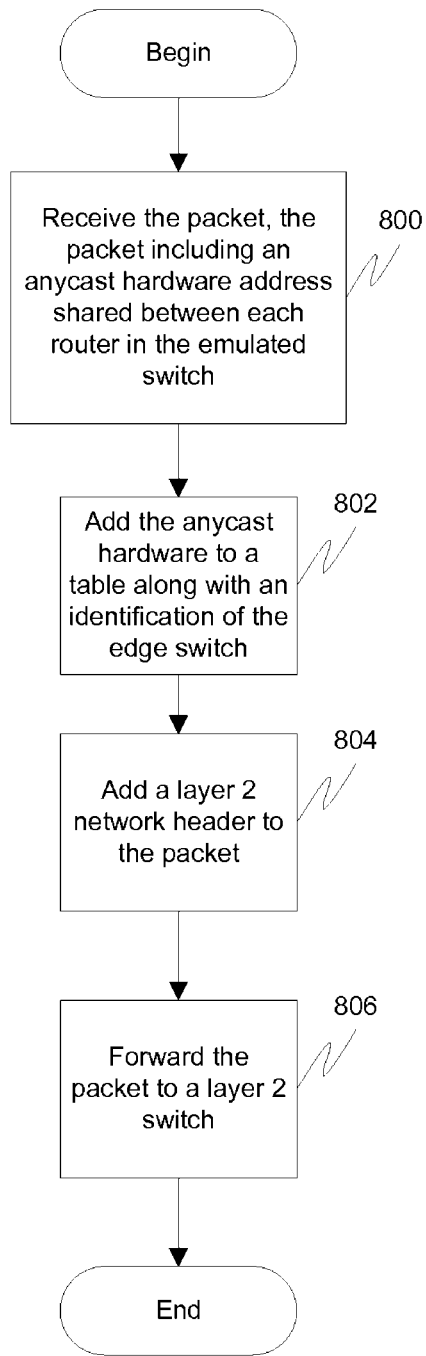
FIG. 8 illustrates an example method for handling a packet received at a layer 2 edge switch from a router in an emulated switch of two or more routers.

FIG. 8 illustrates an example method for handling a packet received at a layer 2 edge switch from a router in an emulated switch of two or more routers. At 800, the packet may be received. The packet may be an ARP reply but it could also be ordinary traffic. The packet may include an anycast hardware address shared between each router in the emulated switch. At 802, the anycast hardware address may be added to a table along with an identification of the edge switch. This table may be periodically synchronized with tables associated with other layer 2 switches in the network. At 804, a layer 2 network header, such as a MAC-in-MAC header, may be added to the packet. At 806, the packet may be forwarded to another layer 2 switch in the network.

Figure 9:
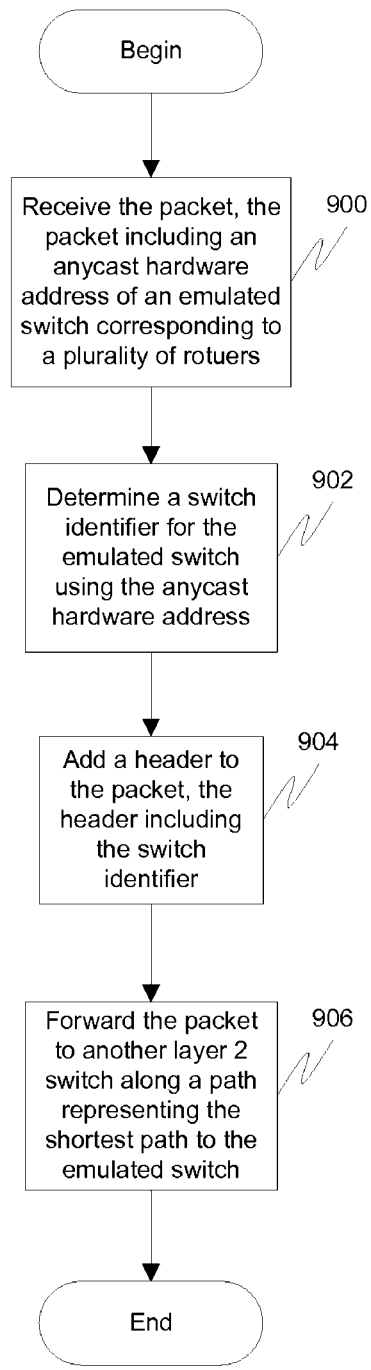
FIG. 9 illustrates an example method for handling a packet from a host at an edge switch in a network containing layer 2 switches.

FIG. 9 illustrates an example method for handling a packet from a host at an edge switch in a network containing layer 2 switches. At 900, the packet may be received. The packet may include an anycast hardware address of an emulated switch corresponding to a plurality of routers. At 902, a switch identifier may be determined for the emulated switch using the anycast hardware address. This may be determined by, for example, looking up the anycast hardware address in a table to retrieve the switch identifier. At 904, a header may be added to the packet, the header including the switch identifier. This header may be a layer 2 network header, such as a MAC-in-MAC header. At 906, the packet may be forwarded to another layer 2 switch along the shortest path to the emulated switch. The shortest path may be determined by for example, referencing a spanning tree created for the switches, including the emulated switch. If there is a tie between two paths such that the shortest path cannot be determined based on distance, the tie may be broken by, for example, referencing a hash table based upon the source address of the packet.

Figure 10:
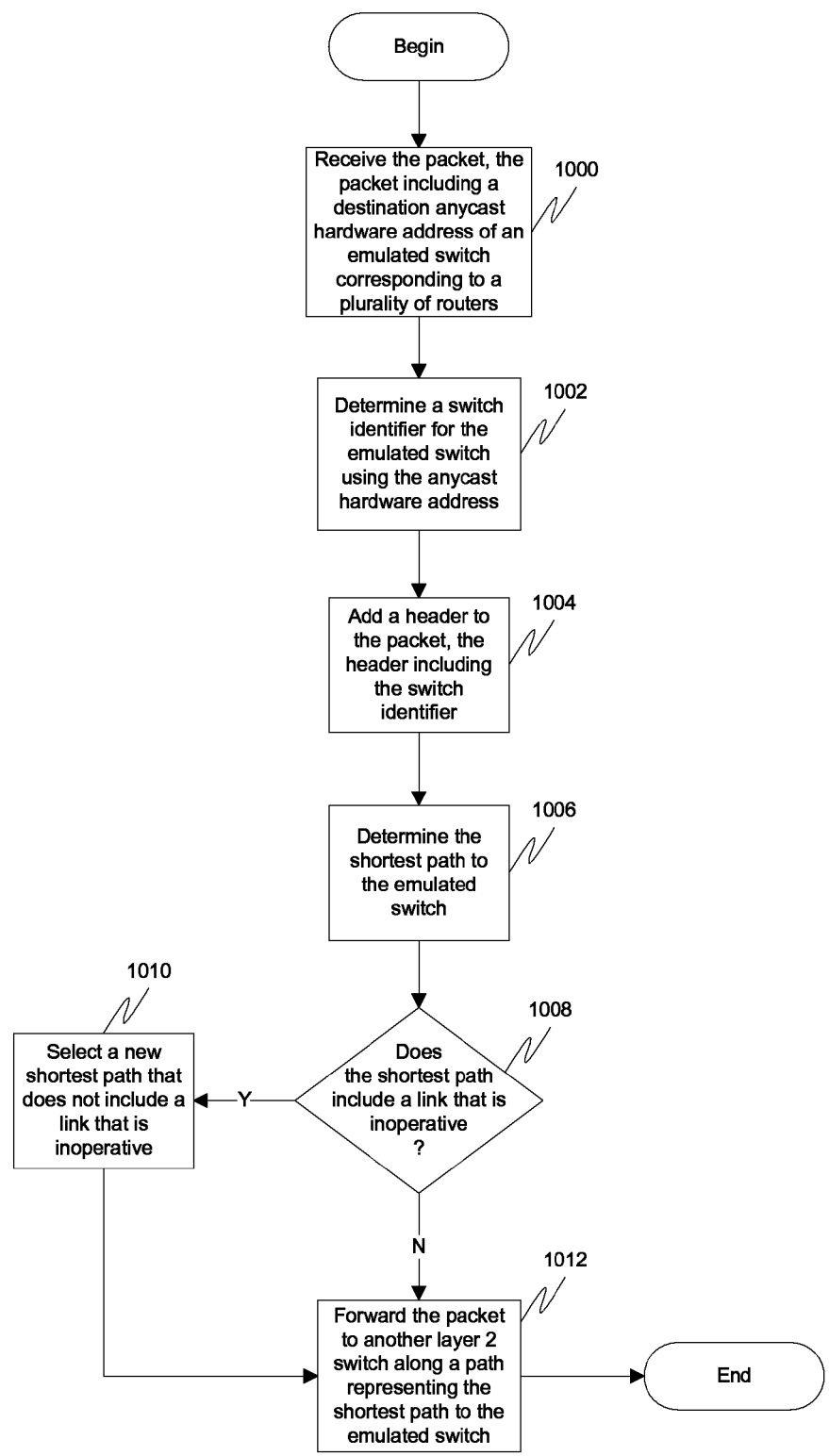
FIG. 10 illustrates an example method for handling a packet from a host at an edge switch in a network containing layer 2 switches.

FIG. 10 illustrates an example method for handling a packet from a host at an edge switch in a network containing layer 2 switches. At 1000, the packet may be received. The packet may include a destination anycast hardware address of an emulated switch corresponding to a plurality of routers. At 1002, a switch identifier may be determined for the emulated switch using the anycast hardware address. This may be determined by, for example, looking up the anycast hardware address in a table to retrieve the switch identifier. At 1004, a header may be added to the packet, the header including the switch identifier. This header may be a layer 2 network header, such as a MAC-in-MAC header. At 1006, a shortest path to the emulated switch may be determined. At 1008, it may be determined if the shortest path includes a link that is inoperative. If so, then at 1010, a new shortest path may be selected that does not include a link that is inoperative. At 1012, the packet may be forwarded to another layer 2 switch along a path representing the shortest path to the emulated switch. The shortest path may be determined by for example, referencing a spanning tree created for the switches, including the emulated switch. If there is a tie between two paths such that the shortest path cannot be determined based on distance, the tie may be broken by, for example, referencing a hash table based upon the source address of the packet.

Figure 11:
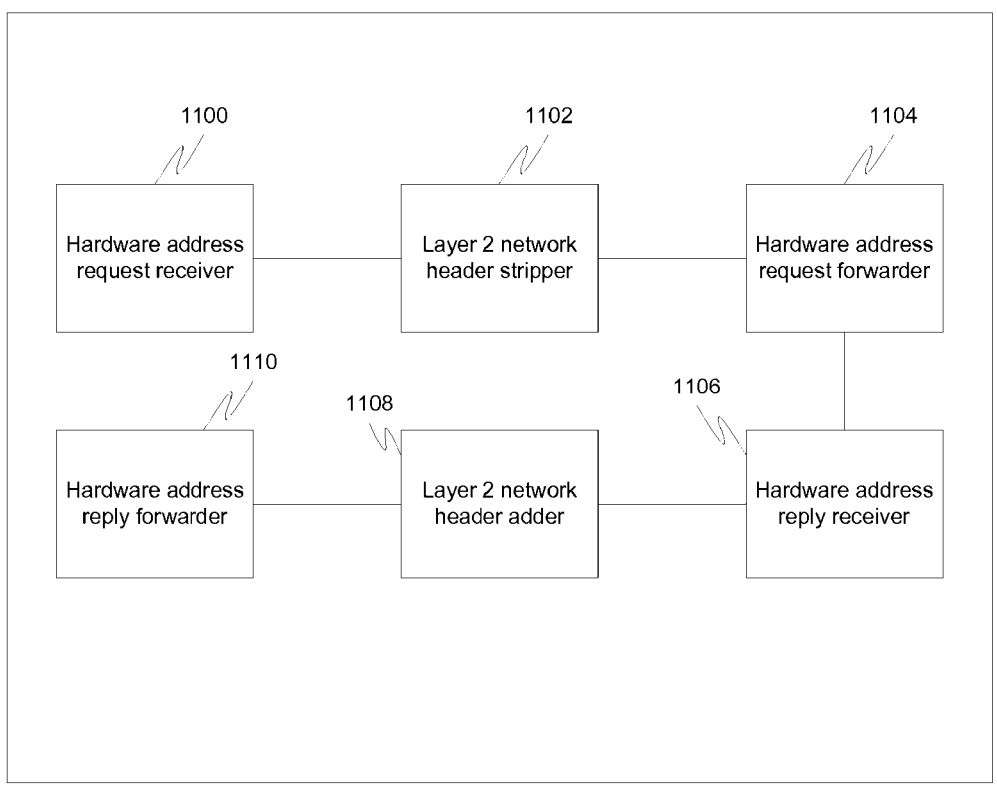
FIG. 11 illustrates an example apparatus for handling a hardware address request to a router in an emulated switch of two or more routers.

FIG. 11 illustrates an example apparatus for handling a hardware address request to a first router in an emulated switch of two or more routers. This apparatus may be a layer 2 edge switch or a portion of a layer 2 edge switch (e.g., software). A hardware address request receiver 1100 may receive the hardware address request from a layer 2 switch. This request may be an ARP request and may include a layer 2 network header (e.g., MAC-in-MAC header) that was added to the request by another layer 2 switch (not necessarily the layer 2 switch from which the request was directly received). A layer 2 network header stripper 1102 coupled to the hardware address request receiver 1100 may strip this layer 2 network header from the request. A hardware address request forwarder 1104 coupled to the layer 2 network header stripper 1102 may forward the hardware address request to the first router. It does not matter which router within the emulated switch is designated as the first router. A hardware address reply receiver 1106 may receive a hardware address reply from the router. This reply may be an ARP reply and may include an anycast hardware address shared between each router in the emulated switch. A layer 2 network header adder 1108 coupled to the hardware address reply receiver 1106 may add a layer 2 network header, such as a MAC-in-MAC header, to the hardware address reply. A hardware address reply forwarder 1110 coupled to the layer 2 network header adder 1108 may forward the hardware address to another layer 2 switch. This may or may not be the same layer 2 switch as before.

Figure 12:
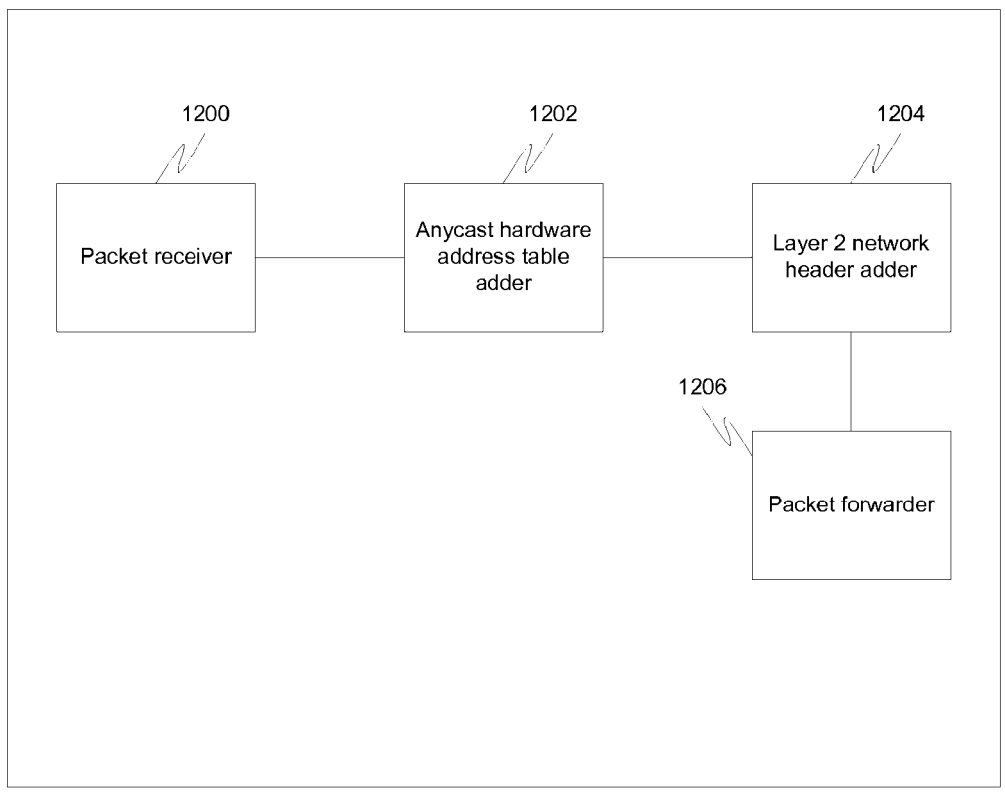
FIG. 12 illustrates an example apparatus for handling a packet received at a layer 2 edge switch from a router in an emulated switch of two or more routers.

FIG. 12 illustrates an example apparatus for handling a packet received at a layer 2 edge switch from a router in an emulated switch of two or more routers. A packet receiver 1200 may receive the packet. The packet may be an ARP reply but it could also be ordinary traffic. The packet may include an anycast hardware address shared between each router in the emulated switch. An anycast hardware address table adder 1202 coupled to the packet receiver 1200 may add the anycast hardware address request to a table along with an identification of the edge switch. This table may be periodically synchronized with tables associated with other layer 2 switches in the network. A layer 2 network header adder 1204 coupled to the anycast hardware address table adder 1202 may add a layer 2 network header, such as a MAC-in-MAC header, to the packet. A packet forwarder 1206 coupled to the layer 2 network header adder 1204 may forward the packet to a layer 2 switch in the network.

Figure 13:
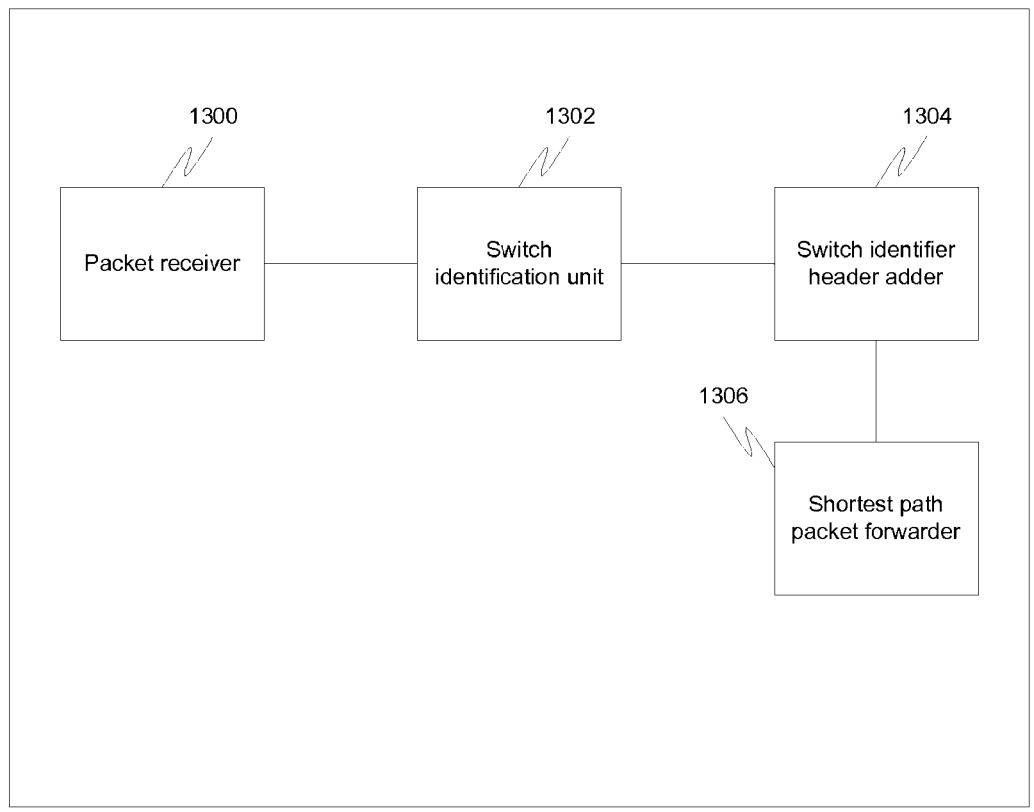
FIG. 13 illustrates an example apparatus for handling a packet from a host at an edge switch in a network containing layer 2 switches.

FIG. 13 illustrates an example apparatus for handling a packet from a host at an edge switch in a network containing layer 2 switches. A packet receiver 1300 may receive the packet. The packet may include an anycast hardware address of an emulated switch corresponding to a plurality of routers. A switch identification unit 1302 coupled to the packet receiver 1300 may determine a switch identifier for the emulated switch using the anycast hardware address. This may be determined by, for example, looking up the anycast hardware address in a table to retrieve the switch identifier. A switch identifier header adder 1304 coupled to the switch identification unit 1302 may add a header to the packet, the header including the switch identifier. This header may be a layer 2 network header, such as a MAC-in-MAC header. A shortest path packet forwarder 1306 coupled to the switch identifier header adder 1304 may forward the packet to another layer 2 switch along a path representing the shortest path to the emulated switch. The shortest path may be determined by for example, referencing a spanning tree created for the switches, including the emulated switch. If there is a tie between two paths such that the shortest path cannot be determined based on distance, the tie may be broken by, for example, referencing a hash table based upon the source address of the packet.

Figure 14:
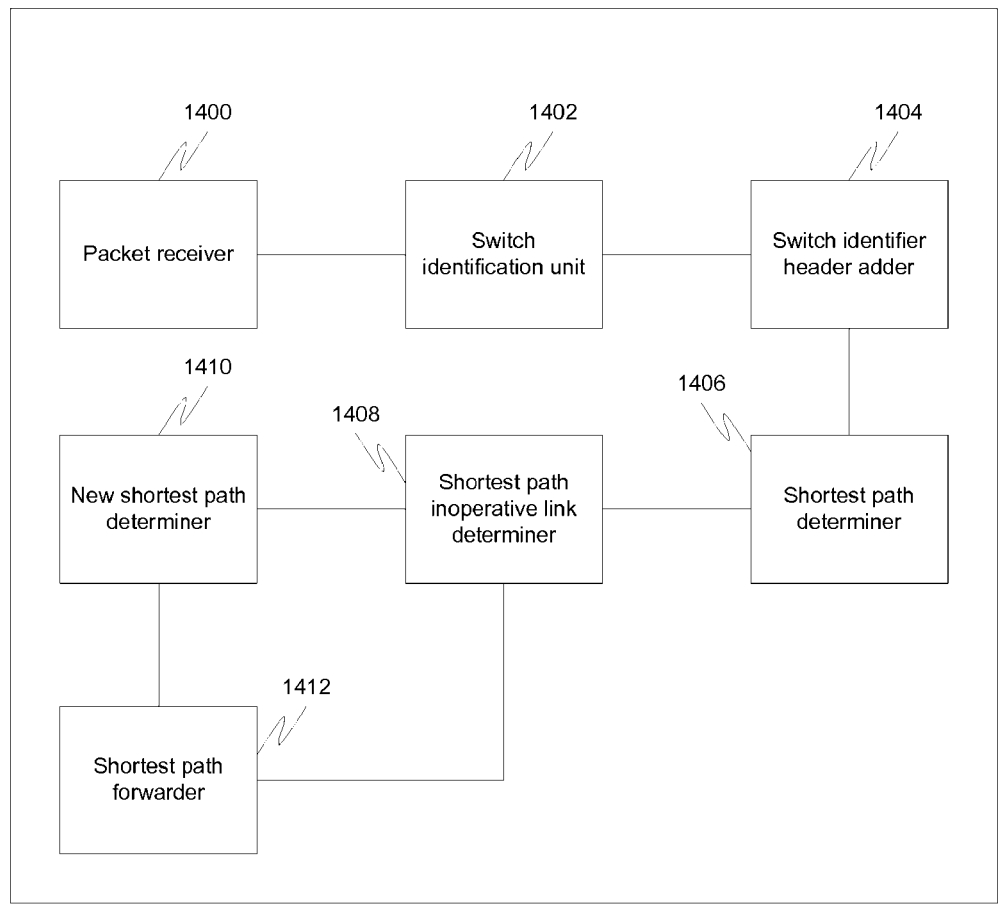
FIG. 14 illustrates an example apparatus for handling a packet from a host at an edge switch in a network containing layer 2 switches.

FIG. 14 illustrates an example apparatus for handling a packet from a host at an edge switch in a network containing layer 2 switches. A packet receiver 1400 may receive the packet. The packet may include a destination anycast hardware address of an emulated switch corresponding to a plurality of routers. A switch identification unit 1402 coupled to the packet receiver 1400 may determine a switch identifier for the emulated switch using the anycast hardware address. This may be determined by, for example, looking up the anycast hardware address in a table to retrieve the switch identifier. A switch identifier header adder 1404 coupled to the switch identification unit 1402 may add a header to the packet, the header including the switch identifier. This header may be a layer 2 network header, such as a MAC-in-MAC header. A shortest path determiner 1406 coupled to the switch identifier header adder may determine a shortest path to the emulated switch. A shortest path inoperative link determiner 1408 coupled to the shortest path determiner 1406 may determine if the shortest path includes a link that is inoperative. If so, then a new shortest path determiner 1410 coupled to the shortest path inoperative link determiner may select a new shortest path that does not include a link that is inoperative. A shortest path packet forwarder 1412 coupled to the shortest path inoperative link determiner 1408 and the new shortest path determiner 1410 may forward the packet to another layer 2 switch via a path representing the shortest path to the emulated switch. The shortest path may be determined by for example, referencing a spanning tree created for the switches, including the emulated switch. If there is a tie between two paths such that the shortest path cannot be determined based on distance, the tie may be broken by, for example, referencing a hash table based upon the source address of the packet.

In each of these embodiments, various protocols may be used (for example, DCE using the IS-IS protocol). Additionally, in each of these embodiments, it is no longer necessary to run a hot standby routing protocol.

Figure 15:
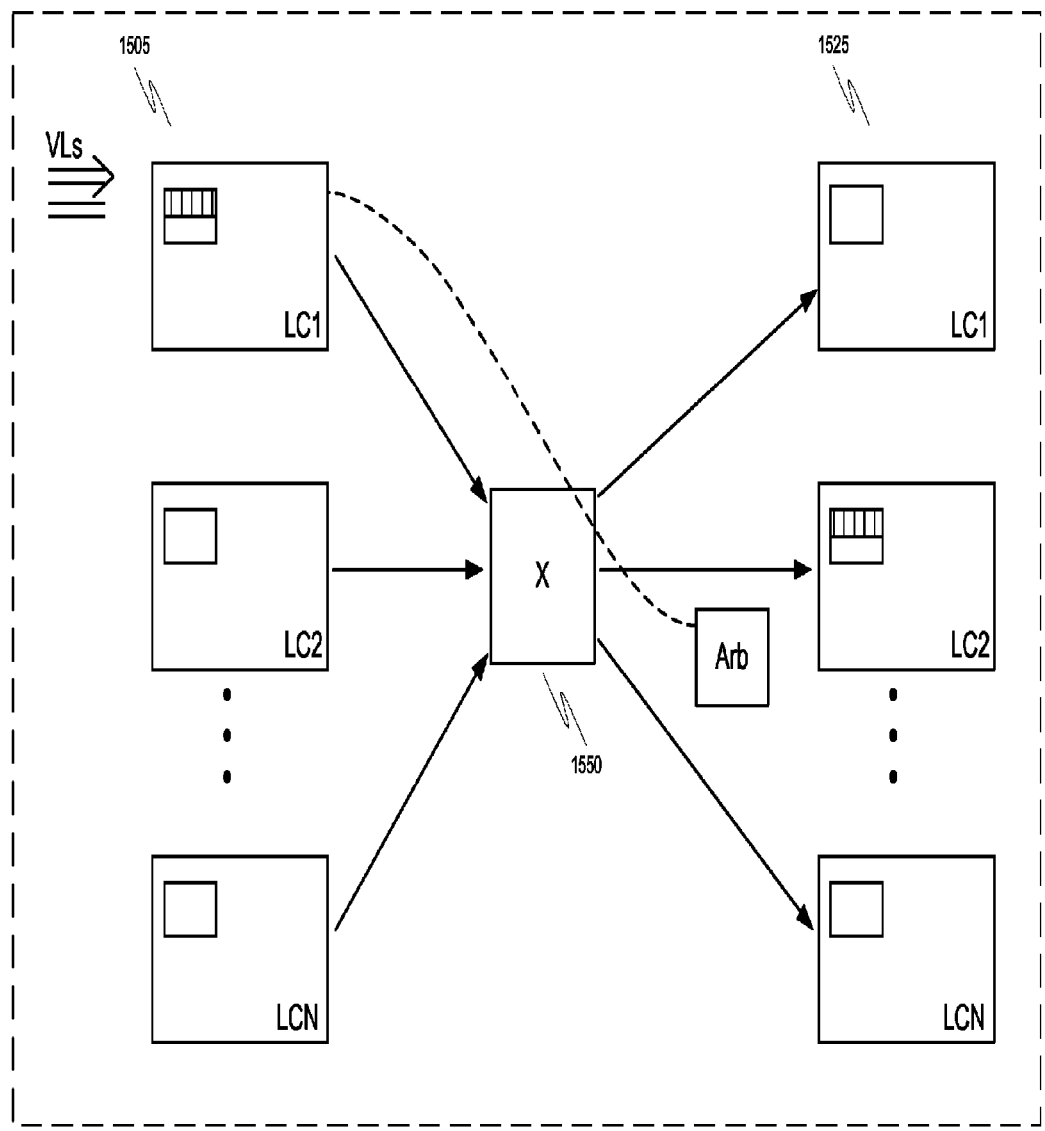
FIG. 15 illustrates a simplified architecture of DCE switch.

FIG. 15 illustrates a simplified architecture of DCE switch 1500. DCE switch 1500 includes N line cards, each of which characterized by and ingress side (or input) 1205 and an egress side (or output) 1525. Line card ingress sides 1505 are connected via switching fabric 1550, which includes a crossbar in this example, to line card egress sides 1525. In this embodiment, one or more of the processes described above is performed by one or more of the line cards.

Although illustrative embodiments and applications of this invention are shown and described herein, many variations and modifications are possible which remain within the concept, scope, and spirit of the invention, and these variations would become clear to those of ordinary skill in the art after perusal of this application. For example, it is possible that an edge switch is connected to multiple routers within a single emulated switch. Accordingly, the embodiments described are to be considered as illustrative and not restrictive, and the invention is not to be limited to the details given herein, but may be modified within the scope and equivalents of the appended claims.

We claim:

1. An apparatus, comprising:
   a processor; and
   a memory, at least one of the processor or the memory being adapted for:
   receiving a packet by an edge switch, wherein the packet includes an anycast address that corresponds to a same address that is assigned to each of a plurality of routers of an emulated switch, the network including a plurality of switches;
   adding a header to the packet; and
   forwarding the packet from the edge switch to another switch.

2. The apparatus of claim 1, at least one of the processor or the memory being adapted for performing steps, further comprising: determining a switch identifier for the emulated switch using the anycast address; wherein the header includes the switch identifier.

3. The apparatus of claim 2, wherein the determining comprises looking up the anycast address in a table to retrieve the switch identifier.

4. The apparatus of claim 1, wherein forwarding comprises forwarding the packet to another switch along a shortest path from the edge switch to the emulated switch.

5. The apparatus of claim 4, at least one of the processor or the memory being further adapted for performing steps, comprising:
   determining the shortest path.

6. The apparatus of claim 4, wherein the shortest path is a shortest operative path from the edge switch to the emulated switch.

7. The apparatus of claim 4, wherein the shortest path is determined based on a source address of the packet, using a hash table, if the shortest path cannot be determined based on distance due to a tie between two or more paths.

8. The apparatus of claim 1, wherein the same address is a Media Access Controller (MAC) address, wherein the anycast address corresponds to the same MAC address that is assigned to each of the routers of the emulated switch.

9. The apparatus of claim 1, wherein the routers do not run a hot standby routing protocol.

10. The apparatus of claim 1, wherein the network including the plurality of switches is a Data Center Ethernet (DCE) network.

11. An apparatus, comprising:

a processor; and a memory, at least one of the processor or the memory being adapted for:

transmitting an address request to an emulated switch including a plurality of routers, wherein each of the plurality of routers of the emulated switch is assigned a same address; and receiving an address reply from the emulated switch, the address reply including an anycast address shared between each router in the emulated switch, wherein the anycast address corresponds to the same address that is assigned to each of the routers of the emulated switch.

12. The apparatus of claim 11, wherein transmitting an address request to an emulated switch comprises transmitting the address request to a first one of the plurality of routers of the emulated switch, and wherein receiving an address reply from the emulated switch comprises receiving the address reply from the first router, the address reply including an anycast address shared between each router in the emulated switch.

13. The apparatus of claim 12, wherein the network device has an interface with the first one of the plurality of routers of the emulated switch.

14. The apparatus of claim 11, wherein the network device has an interface with at least one of the plurality of routers of the emulated switch.

15. A method, comprising:

transmitting an address request to an emulated switch including a plurality of routers, wherein each of the plurality of routers of the emulated switch is assigned a same address; and receiving an address reply from the emulated switch, the address reply including an anycast address shared between each router in the emulated switch, wherein the anycast address corresponds to the same address that is assigned to each of the routers of the emulated switch.

16. A method, comprising:

receiving a packet by a layer 2 edge switch, wherein the packet includes an anycast address that corresponds to a same address that is assigned to each of a plurality of routers of an emulated switch, the network including a plurality of layer 2 switches;

adding a header to the packet; and forwarding the packet from the layer 2 edge switch to another layer 2 switch.

* * * * *